United States Patent [19]

Jacobson et al.

[11] Patent Number: 5,784,577

[45] Date of Patent: Jul. 21, 1998

[54] AUTOMATED CONTROL SYSTEM FOR PROGRAMMING PLDS

[76] Inventors: Neil G. Jacobson, 221 Lassen Ave., Mountain View, Calif. 94043; David Chiang, 18658 Casa Blanca La., Saratoga, Calif. 95070

[21] Appl. No.: 699,068

[22] Filed: Aug. 5, 1996

[51] Int. Cl.[6] .................................. G06F 12/14; G06F 13/10
[52] U.S. Cl. ...................... 395/284; 395/497.01; 395/490
[58] Field of Search ............................... 395/284, 497.01, 395/490

[56] References Cited

U.S. PATENT DOCUMENTS

| | | | |
|---|---|---|---|
| 4,852,044 | 7/1989 | Turner et al. | 326/8 |
| 5,249,285 | 9/1993 | Mueller et al. | 395/425 |
| 5,287,519 | 2/1994 | Dayan et al. | 395/700 |
| 5,497,498 | 3/1996 | Taylor | 395/800 |
| 5,535,342 | 7/1996 | Taylor | 395/307 |
| 5,581,120 | 12/1996 | Gudger | 326/41 |
| 5,603,043 | 2/1997 | Taylor et al. | 395/800 |

*Primary Examiner*—Ayaz R. Sheikh
*Attorney, Agent, or Firm*—Jeanette S. Harms

[57] ABSTRACT

In an automated control system, a user must be authorized to modify the configuration data of a programmable logic device (PLD). After authorization is confirmed, the PLD is unlocked. Then, the configuration data of the PLD and the contents of a version control register are read back and archived, thereby providing a security back-up should the user need to retrieve the original data. After readback, the version control number is automatically incremented. This incremented version control number and the modified configuration data provided by the user are downloaded to the PLD. Finally, the PLD is locked.

1 Claim, 2 Drawing Sheets

AUTOMATED CONTROL SYSTEM FOR PROGRAMMING PLDS

BACKGROUND OF THE INVENTION

1. Field of the Invention

The present invention relates to programmable logic devices (PLDs), and in particular to an automated control system for programming PLDs.

2. Description of the Related Art

Programmable logic devices (PLDs) include non-volatile (e.g. EPROM, EEPROM, Flash EPROM, Flash EEPROM, or antifuse) or volatile (e.g. SRAM or DRAM) memory cell arrays which programmably create data paths and logic functions within the devices that are specific to the user's design. The information stored in these arrays is known as configuration data. Typically, these arrays are erasable, thereby allowing the desired functionality of the PLD to be changed many times.

The industry is increasingly using PLDs that can be programmed, erased, and verified in-system, that is, while these devices are soldered into place on the circuit board in which the devices will be used. As is well known to those in the art, the term in-system programmable refers to the entire process of programming a device in-system, and, therefore, encompasses the actions of erasing and verifying the design in the device in addition to the specific action of memory cell programming.

In complex systems that use multiple ISP PLDs, tracking the specific device configuration version in each device is difficult. Typically, multiple ISP PLDs are serially connected for both programming as well as data read out (i.e. verifying). Additional information on the programming, erasing, and verifying of ISP devices is provided in U.S. patent Ser. No. 08/512,796, entitled "Efficient In-System Programming Structure and Method for Non-Volatile Programmable Logic Devices", which is incorporated herein by reference. If no version information is provided on-chip, a user would have to read out the configuration data from each device to determine the configuration version stored in that device. Clearly, as the number of PLDs increase, this read out procedure becomes increasingly time-consuming and thus undesirable.

To solve this problem, some PLDs include "user signature" registers that store user-specified information. For example, the user may use a user signature register on a PLD to store a short descriptive name and configuration version number for that PLD. The IEEE Standard 1149.1 Test Access Port and Boundary-Scan Architecture (commonly known as JTAG) provides a 32-bit register (referred to as a user code register) which can be used as a user signature register. However, updating the data stored in the user signature register is dependent upon the user manually providing the correct information. Thus, because the correct version may be accidentally overwritten with an incorrect one, a user has no assurance of the correctness of the version information.

Another problem commonly encountered in a complex ISP multiple PLD system is that of unauthorized users programming various PLDs. To solve this problem, some PLDs include a "data protect" bit that disables device programming when set. FIG. 1 illustrates a flowchart for the programming operation of a PLD with a data protect bit. Step 101 starts the programming operation. In step 102, the system (i.e. a computer program for programming the PLD) determines whether the data protect bit has been set. If set, then the system skips to step 104 which ends the programming operation. If the data protect bit has not been set, the system inputs the configuration data in step 103, thereby programming the device. After programming in step 103, the system ends the programming operation in step 104. In some systems using electrically programmable logic devices (EPLDs), programming of the data protect bit is done in conjunction with the programming of the PLD. Thus, reversing the set data protect bit in those systems requires removing the PLD from the board for UV erasing, thereby undesirably consuming engineering time and resources. Moreover, in other systems, the programming of the data protect bit is hard-wired into the PLD, thereby making the bit set operation irreversible.

Therefore, a need arises for an accurate, overridable method of tracking versions of the PLDs, as well as preventing unauthorized users from programming the PLDs.

SUMMARY OF THE INVENTION

In accordance with the present invention, a user must be authorized to modify the configuration data of a programmable logic device (PLD). This authorization is typically implemented by using a predetermined code access. Once authorization is confirmed, the PLD is unlocked. Then, the configuration data and the contents of a version control register (for example, a version control number) are read back. In a preferred embodiment, the original configuration data and the contents of the version control register are archived, thereby providing a security back-up should the user need to retrieve the original data. After readback, the version control number is automatically incremented. This incremented version control number and the new configuration data provided by the user are downloaded to the PLD, thereby programming that device. Finally, the PLD is locked.

In one embodiment, circuitry for unlocking/locking the PLD includes a data protect override key register, an input key register, and a comparator. After the appropriate number of bits are provided to the input key register, the system sends an enabling signal to the comparator which in turn compares the bits stored in the data protect override key register and the bits in the input key register. If the bits in the two registers are identical, then the comparator outputs a disable data protect signal, thereby allowing modification of the configuration data in that PLD. After the incremented version control number and the modified configuration data are downloaded to the PLD, the system sends a disabling signal to the comparator, thereby preventing further modification to the configuration data.

DETAILED DESCRIPTION OF THE DRAWINGS

Figure 2:
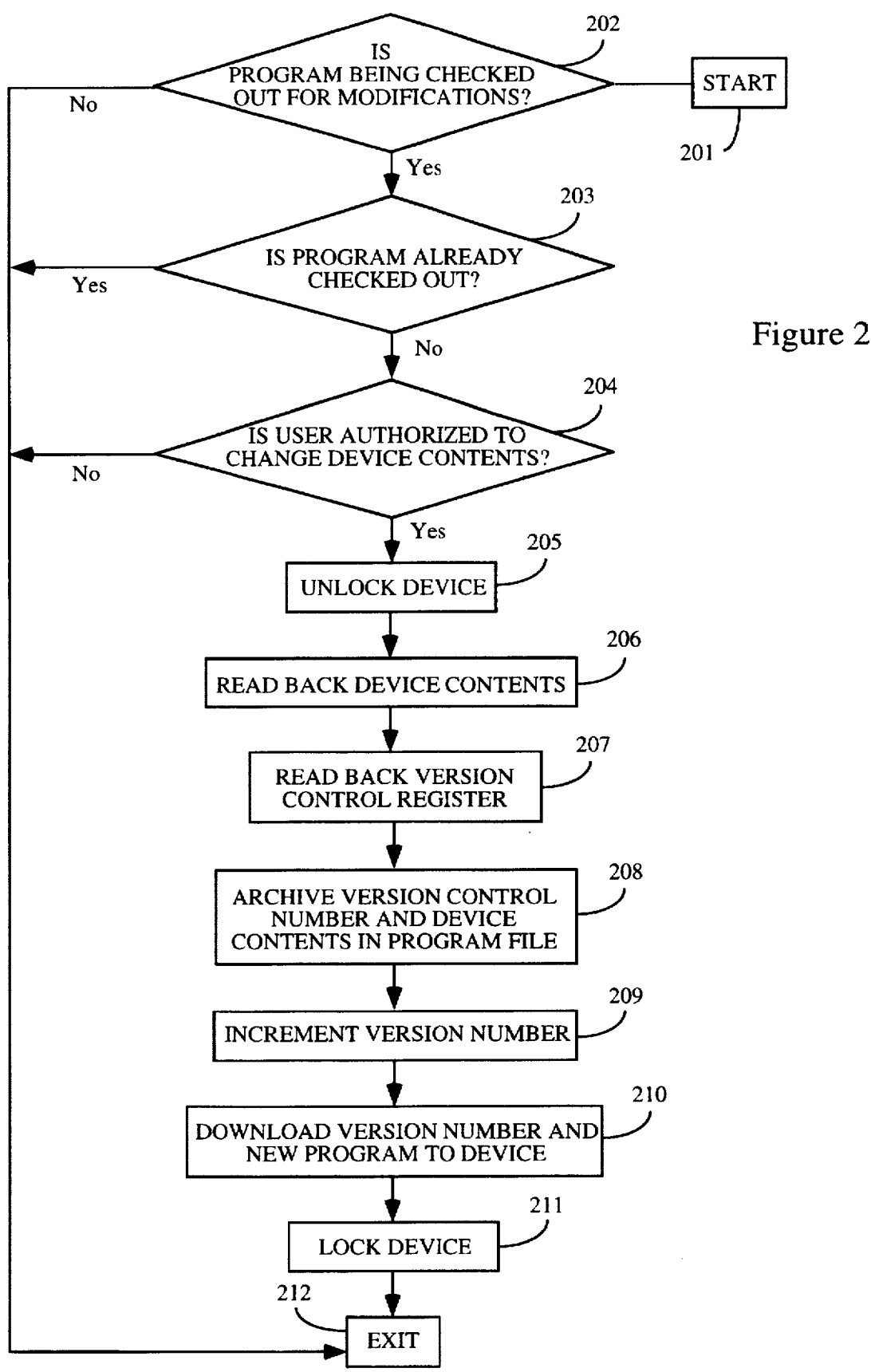
FIG. 2 shows a flowchart of a method of programming a device in accordance with the present invention.

FIG. 2 illustrates a flowchart of one method in accordance with the present invention of providing configuration data to a programmable logic device (PLD). The programming operation begins at step 201. During step 202, the system determines whether the configuration program is being checked out for modification, i.e. whether the user wants to modify the configuration data for a particular PLD (in other words, program or reprogram the device). Typically, this step is implemented by the system requesting a user response. If the user's response is that the program is not being checked out for modification, then the system goes to step 212 and exits the programming operation. If the program is being checked out for modification, then the system next determines whether the program is already "checked out" to another user in step 203. Typically, a number of users are authorized to program the PLDs in the system simultaneously via a computer network. However, the configuration data of any one PLD can be modified only by one user at any point in time. In one embodiment, if the program is checked out at that point in time by another user, the system merely ends the programming operation by going to step 212. In other embodiments, before exiting, the system provides information about the user who has checked out the program, the time the program was checked out, or the location of the computer terminal being used for the configuration modification.

Next, the system determines whether a user is authorized to change the configuration data of the PLD in step 204. In one embodiment, step 204 includes providing a system request on screen which requires a password. In other embodiments, the system automatically reads an access code associated with the user or the specific computer terminal on which the user is working. For purposes of this description, both the password and the access code are hereinafter referenced as an "input key". If the user is not authorized to change the configuration data, the system skips to step 212 which ends the programming operation. In this manner, an unauthorized user may not change the configuration data in the PLD.

Assuming the user is authorized, the system automatically "unlocks" the PLD in step 205. In accordance with the present invention, the term "unlocking" means the system disables the data protect bit on the PLD and the term "locking" means the system enables the data protect bit. Typically, at this time, the system runs a "BLANK CHECK" operation which determines if each programmable location on the PLD is unprogrammed. This operation may be accomplished via an external software-driven read operation or an internal hardware-driven test circuit, either of which is well known in the art. If the system determines that the PLD is being programmed for the first time, and thus the data protect bit is already disabled, then the system proceeds immediately to step 206. On the other hand, if the system determines that the PLD is already programmed, then the device must be unlocked as described in reference to FIG. 3.

Figure 1:
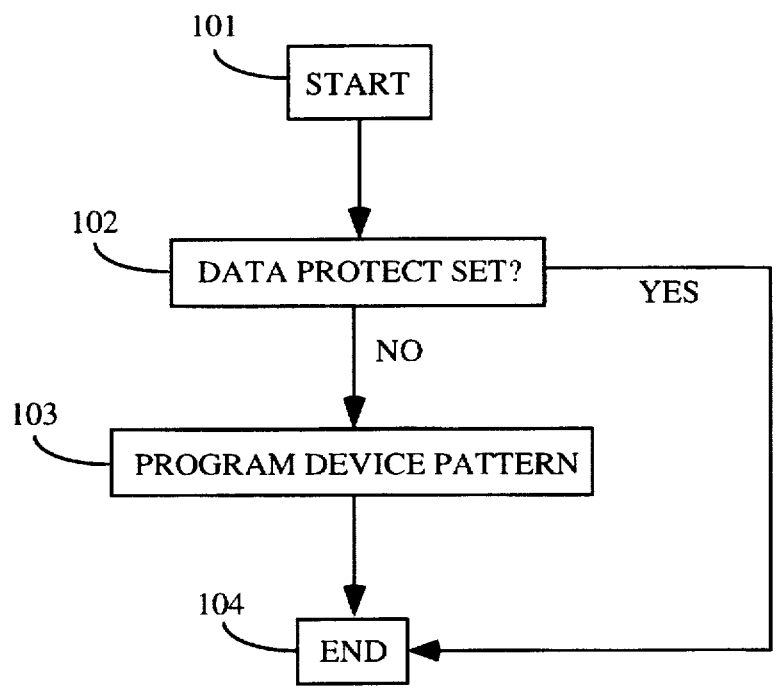
FIG. 1 illustrates a flowchart for the programming operation of a PLD with a data protect bit.
Figure 3:
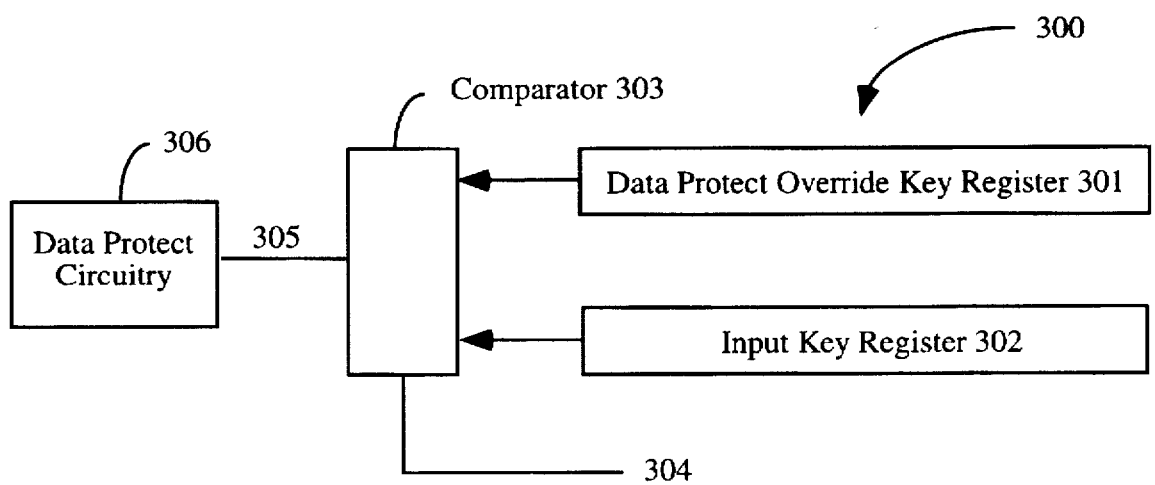
FIG. 3 illustrates one embodiment of circuitry for unlocking/locking a PLD.

Circuitry for unlocking (and subsequently locking) a PLD in accordance with one embodiment of the present invention is illustrated in FIG. 3. Specifically, circuitry 300 includes a data protect override key register 301, an input key register 302, and a comparator 303. Disabling of the data protect bit is triggered in the following manner. After the input key is stored to input key register 302 (step 204 in FIG. 2), the system provides an enabling signal on line 304 to comparator 303. Thus enabled, comparator 303 compares the value stored in data protect override key register 301 and the input key stored in input key register 302. If the values are identical (indicating an authorized user), then comparator 303 outputs a disable data protect signal on line 305 to conventional data protect circuitry 306, thereby disabling the data protect bit and allowing modification of the configuration data in that PLD. The "disabling" of the data protect bit is accomplised in one embodiment by electrically erasing that bit in a particular program address on the device.

Note that in a preferred embodiment, the data protect override key register 301 is programmable, thereby allowing the stored value in that register to change from device to device and from program to program. However, in other embodiments, register 301 is hard-coded into the hardware of the device. In yet other embodiments, multiple bits are stored at various locations on the device. For example, in one such embodiment, each functional block in the PLD has a bit deemed to be part of the contents of data protect override key register 301.

Referring back to FIG. 2, assuming the PLD is "unlocked" in step 205, the configuration data are read back in step 206 and the contents of a version control register are read back in step 207. In one embodiment, the version control register of the present invention is the 32-bit user code register endorsed in the IEEE 1149.1 standard and previously mentioned. In this manner, the contents of the version control register are easily accessible and can be read back serially via standard JTAG methods. In this embodiment of the present invention, the version control number and the configuration data are archived in a program file in step 208, thereby providing a security backup should the user need to retrieve the original information. In step 209, the version number is incremented. After the version number and the new configuration data are downloaded in step 210, the reprogrammed device is locked in step 211. In one embodiment, this locking step is implemented by an enable signal provided on line 304. The "enabling" of the data protect bit is accomplised in one embodiment by electrically programming that bit in a particular program address on the device. Finally, the programming operation is ended in step 212.

The present invention provides the following advantages:

- the ability to lock the PLD, thereby disabling any programming of the device;
- the ability to unlock the PLD, thereby allowing modifications to be made to the configuration data of the device;
- the ability to archive the version control number and configuration data while modifications to the configuration data are being made, thereby providing a security back-up should the user need to retrieve the original data;
- the ability to automatically update and store the new version control number and the new configuration data once all modifications are made; and
- the ability to access all the above functions and features via a standard interface, such as the IEEE Standard 1149.1 Standard Test Access Port and Boundary-Scan Architecture.

The description of the present invention is illustrative only and not limiting. For example, in some embodiments, the order of steps 202 and 203 is switched, whereas in other embodiments, the order of steps 206 and 207 is switched. These and other embodiments will be obvious to those skilled in the art in light of the detailed description and are included within the scope of the present invention as defined by the appended claims.

We claim:

1. A method for modifying the configuration data of a programmable logic device (PLD), the method comprising the steps of:

authorizing a user to change said configuration data;

unlocking said PLD;

reading back said configuration data;

reading back the contents of a version control register;

archiving said contents and said configuration data incrementing said contents;

inputting new configuration data;

downloading the incremented contents and the new configuration data to said PLD; and locking said PLD.

* * * * *

UNITED STATES PATENT AND TRADEMARK OFFICE
CERTIFICATE OF CORRECTION

PATENT NO. : 5,784,577
DATED : July 21, 1998
INVENTOR(S) : Neil G. Jacobson, et. al.

It is certified that error appears in the above-identified patent and that said Letters Patent is hereby corrected as shown below:

Title page, item [73] add -- Assignee: Xilinx, Inc., San Jose, Calif. --.

Signed and Sealed this

Third Day of October, 2000

Attest:

Q. TODD DICKINSON

*Attesting Officer*          *Director of Patents and Trademarks*